United States Patent
Hellmann et al.

(10) Patent No.: US 6,374,174 B2
(45) Date of Patent: Apr. 16, 2002

(54) METHOD FOR TERMINATING A BRAKING INTERVENTION OF AN ADAPTIVE CRUISE CONTROL SYSTEM OF A MOTOR VEHICLE

(75) Inventors: Manfred Hellmann, Hardthof; Hermann Winner, Karlsruhe; Albrecht Irion, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/818,826

(22) Filed: Mar. 27, 2001

(30) Foreign Application Priority Data

Mar. 28, 2000 (DE) .......................... 100 15 303

(51) Int. Cl.$^7$ ............................................. B60K 31/04
(52) U.S. Cl. ........................................... 701/96; 701/93
(58) Field of Search ........................ 701/96, 300, 301, 701/95, 93; 340/903, 435; 342/69, 70; 180/169, 170, 171; 318/587

(56) References Cited

U.S. PATENT DOCUMENTS

| | | | | |
|---|---|---|---|---|
| 5,173,859 A | * | 12/1992 | Deering ........................ | 701/96 |
| 6,009,368 A | * | 12/1999 | Labuhn et al. ................ | 701/96 |
| 6,067,031 A | * | 5/2000 | Fanky et al. ................ | 340/903 |
| 6,076,622 A | * | 6/2000 | Chakraborty et al. ....... | 180/169 |
| 6,233,515 B1 | * | 5/2001 | Engelman et al. ............ | 701/96 |
| 6,304,308 B1 | * | 10/2001 | Milot .......................... | 701/91 |
| 6,311,117 B1 | * | 10/2001 | Winner et al. ................ | 701/93 |

* cited by examiner

Primary Examiner—Richard M. Camby
(74) Attorney, Agent, or Firm—Kenyon & Kenyon

(57) ABSTRACT

A method for terminating a braking intervention of an adaptive cruise control system of a motor vehicle. The braking intervention is terminated in accordance with a predefined algorithm in response to the driver overriding of the adaptive cruise control system. In this context, the algorithm is formed in such a manner that a jerk-free transition from braking to acceleration of the motor vehicle is ensured, thus increasing the ride comfort. The transition from braking to acceleration preferably takes place in accordance with a linear function. Provision can also be made for stepwise functions. To prevent the braking operation from being terminated prematurely by an inadvertent actuation of the accelerator, provision is made for a threshold value to be adjusted for the accelerator for a desire of the driver to accelerate. This threshold value is dependent on the deceleration during braking. The higher the braking deceleration is, the more heavily the driver must operate the accelerator to initiate the acceleration process. In the case of a low deceleration, the threshold value is lower, so that it suffices to step more lightly on the accelerator to bring about an acceleration of the motor vehicle.

11 Claims, 3 Drawing Sheets

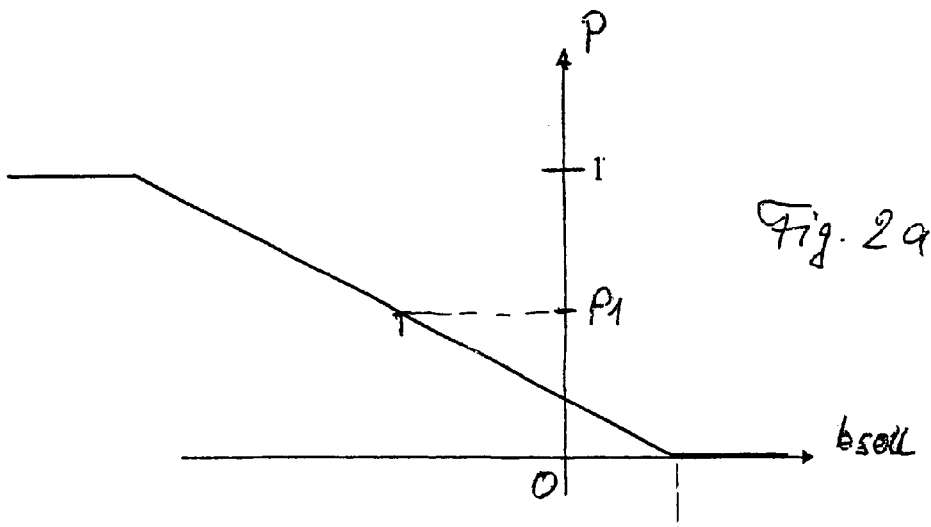
Fig. 2a
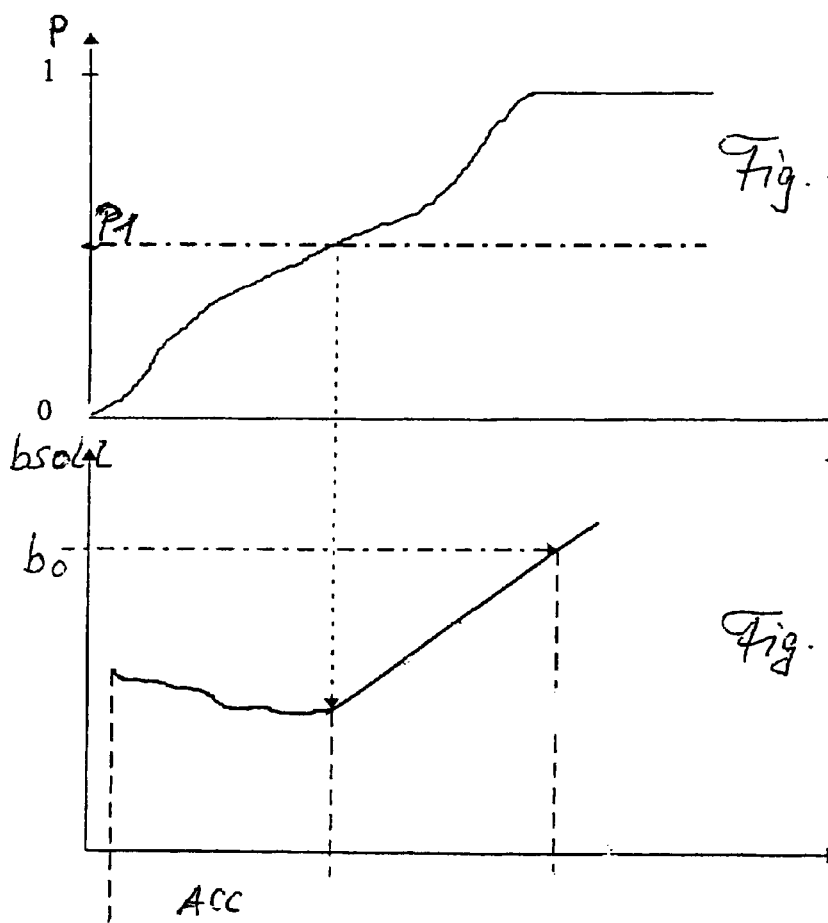
Fig. 2b
Fig. 2c

METHOD FOR TERMINATING A BRAKING INTERVENTION OF AN ADAPTIVE CRUISE CONTROL SYSTEM OF A MOTOR VEHICLE

BACKGROUND INFORMATION

The present invention is based on a method for terminating a braking intervention of an adaptive cruise control system of a motor vehicle. Adaptive cruise control systems are already known which are used for controlling the traveling speed of a motor vehicle as a function of the distance of a vehicle traveling ahead. In the periodical "MOT" No. 18 of Aug. 21, 1999, section "Profi Spezial" (professional's special), for example, a proximity warning device using radar is reported about where a 3- or 5-beam laser or radar sensor scans the space ahead of one's own vehicle with a visual range of up to 150 m. The distance is calculated several times per second from the signals reflected from the vehicle traveling ahead and changes in one's own speed are possibly initiated. Thus, the proximity warning device can increase or reduce the traveling speed so as to reach or maintain a previously input setpoint speed. In practice, however, it has turned out that transitions between the braking of the motor vehicle and the acceleration take place in a more or less jerky manner, in particular when the driver wishes to increase his driving speed. The jerky transition from braking to accelerating is felt to be unpleasant and therefore impairs the ride comfort.

SUMMARY OF THE INVENTION

The method according to the present invention for terminating a braking intervention of adaptive cruise control system for a motor vehicle has the advantage over the background art that the transition from braking to accelerating the motor vehicle is carried out in a jerk-free manner. Because of this, the ride comfort is advantageously increased and the changing over of the adaptive cruise control system is not felt to be disturbing since this behavior rather corresponds to a natural sequence.

It is particularly advantageous for an algorithm to be formed for controlling the transition to acceleration, the calculation of a setpoint acceleration being taken as a basis for the algorithm. By introducing a threshold value for the accelerator position, the braking operation of the system is advantageously prevented from being terminated due to inadvertent contact with the accelerator.

It is also advantageous for the threshold value to be fixed as a function of the deceleration of the vehicle since, for example, an unwanted interruption would have a greater effect during strong deceleration than during low deceleration.

It is likewise considered to be beneficial that the algorithm is determined empirically, thus resulting in a simple adaptation to the vehicle type, the engine power, and to differing driving styles as can be oriented toward, for example, sportive or economic aspects.

The values for the algorithm are advantageously stored in the form of a table or as a function and, consequently, are available at all times.

A favorable solution is also the termination of the proximity control of the adaptive cruise control system if the adaptive cruise control system is overridden through the acceleration by the driver. In this case, an adaptive cruise control is no longer necessary because then, the driver takes over master control during the acceleration phase.

It is also considered to be beneficial that the setpoint values for the engine and brake control are transmitted via an existing vehicle bus, preferably the CAN bus (Controller Area Network). This data is then also available to further control units and can be used, for example, for the driving dynamics control, a navigation system, etc. Thus, it is possible, for example, for road conditions to be considered in the control.

A particularly simple and flexible realization of the algorithm is given by a software program which is preferably implemented in an already existing control unit for vehicle or engine controls.

BRIEF DESCRIPTION OF THE DRAWINGS

FIG. 2a shows a first graph according to the present invention.

FIG. 2b shows a second graph according to the present invention.

FIG. 2c shows a third graph according to the present invention.

DETAILED DESCRIPTION

Figure 1:
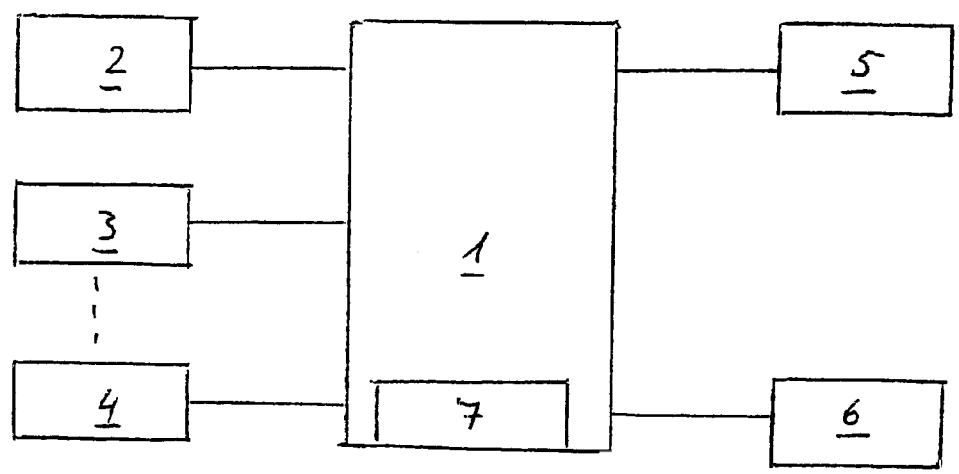
FIG. 1 shows a block diagram according to the present invention.

FIG. 1 shows a block diagram of an adaptive cruise controller which measures, for example, the distance from a vehicle traveling ahead with the assistance of a radar sensor. The adaptive cruise controller has a control unit 1 to which a plurality of sensors, for example, a speed sensor 2, a distance radar 3 and/or a transducer 4 for detecting the position of the accelerator are connected. Control unit 1 has a microcomputer which features a memory 7 in which a corresponding program for determining the vehicle's distance from a vehicle traveling ahead or from an obstacle as a function of the driving parameters is stored. Also stored in memory 7 are values for an algorithm for determining the acceleration during the overriding of the adaptive cruise control. In the case that, depending on the speed, the calculated distance is too low, control unit 1 acts upon a braking module 5 and causes the vehicular speed to be reduced correspondingly. Moreover, control unit 1 can act upon an acceleration module 6 and, together with it, control the required or desired engine torque, for example, during the transition from braking to accelerating the vehicle.

To explain the present invention in greater detail, first, the technical interrelationship is illustrated in FIGS. 2a through 2c on the basis of the diagrams. To this end, FIG. 2a shows a diagram in which, for generating a threshold value P for the accelerator, threshold value P is plotted over setpoint acceleration bSetpoint. The threshold value for acceleration bSetpoint is plotted on the X-axis while normalized threshold value P between values 0 and 1 is plotted on the Y-axis. As can further be gathered from FIG. 2a, the relation between setpoint acceleration bSetpoint and threshold value P is realized using a straight line, the straight line having a negative gradient. During practical travel operation, this means that threshold value P is higher during higher braking deceleration than during lower braking deceleration. In practice, during stronger braking deceleration, the driver must therefore step on the accelerator, his/her gas pedal stronger to exceed, for example, threshold value P1. In the case of a lower braking deceleration, threshold value P is lower as well so that the driver does not need to step on the gas pedal so strongly. This connection between the braking deceleration and threshold value P for the accelerator has the advantage that an inadvertent contact with the accelerator does not necessarily lead immediately to the interruption of the adaptive cruise control. The driver rather has to step on the accelerator deliberately to override the proximity or cruise control. This advantageously results in more safety and a more pleasant driving experience for the driver.

In the diagram of FIG. 2b, position P for the accelerator is represented as a function of time t, likewise in normalized form. This curve is provided by transducer 4 (FIG. 1). If, for example, the threshold value for the accelerator lies at position P1, then the driver has to depress the accelerator still further for terminating the braking operation in a comfortable manner and for accelerating the vehicle. Below threshold value P1, the adaptive cruise controller would continue to operate its control function and remain unaffected by the contact with the accelerator. This relationship can also be gathered from FIG. 2c. Up to the intersection of the P1-line with the pedal position line, the normal control algorithm of the adaptive cruise controller is carried out, i.e., the vehicle continues to be braked. Only after this threshold value is exceeded, for example, in the case of an ESP controller, the braking pressure is reduced in accordance with the predefined algorithm until it reaches approximately 0 at acceleration b0. After that, the drive control begins to operate again, and the vehicle starts to accelerate in accordance with the predefined algorithm to the speed desired by the driver. In this case, however, the driver can also continue to override and take over master control.

Figure 3:
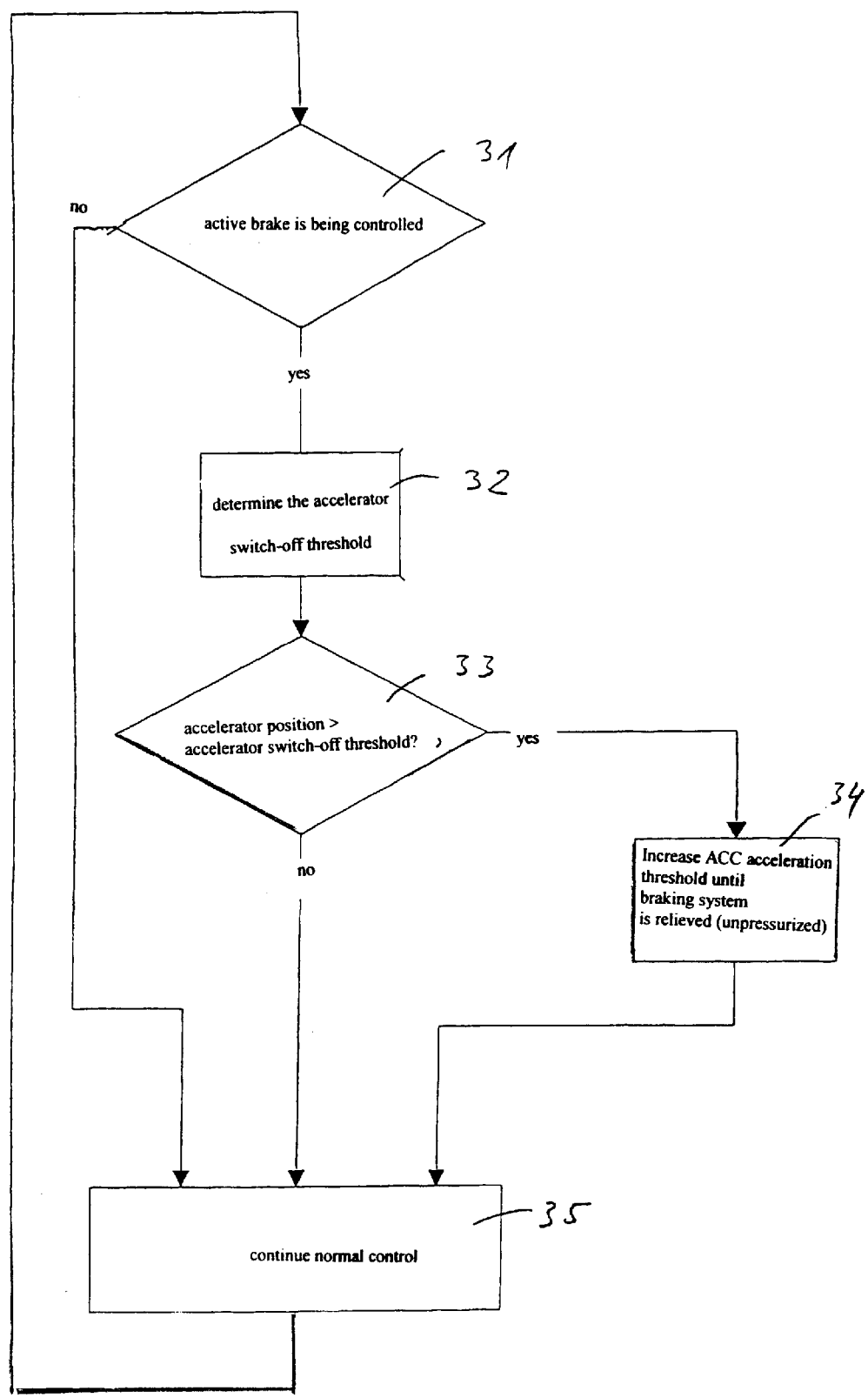
FIG. 3 shows a flow chart according to the present invention.

In the following, the mode of operation is explained once more in greater detail on the basis of the flow chart of FIG. 3. It is started from the assumption that the adaptive cruise control system is currently in an operating state in which control unit 1 actively controls braking module 5 (position 31). Because of the beginning vehicle deceleration, the switch-off threshold for the accelerator is now determined in position 32 in accordance with FIG. 2a. As already explained, the accelerator switch-off threshold is reduced as the setpoint acceleration increases, starting at the pedal maximum value down to a pedal minimum value as a function of the setpoint acceleration. This takes place, for example according to FIG. 2a, in a linear manner. However, provision can also be made for nonlinear functions as well as for a stepwise change in the acceleration or for empirically ascertained values. Thus, as the deceleration increases, a higher pedal switching threshold ensues for terminating the braking operation of the system. Consequently, the pedal travel increases as the deceleration increases, and the driver needs to actuate the accelerator deliberately to achieve a termination of the braking operation.

In position 33, it is then checked whether the accelerator position is larger than the instantaneous switch-off threshold for the accelerator. If this is the case, control unit 1 increases the setpoint value for acceleration bSetpoint in position 34 until the system is unpressurized (FIG. 2c, b0). Subsequently, the normal acceleration control takes place (position 35).

However, if the brake is not actively controlled according to position 31, then the system branches directly to position 35 and continues its normal control. The same applies if the switch-off threshold for the accelerator is not reached according to position 33. In this case too, the normal control is continued. This cycle is repeated continuously so that it is continued again in position 31.

What is claimed is:

1. A method for terminating a braking intervention of an adaptive cruise control system of a motor vehicle, comprising the steps of:

supplying an acceleration signal to the adaptive cruise control system in response to a driver of the motor vehicle actuating an accelerator of the motor vehicle;

in response to the acceleration signal, causing the adaptive cruise control system to cancel a current braking intervention and the motor vehicle to be accelerated in accordance with a position of the accelerator; and terminating at least one of (a) the braking intervention and (b) a deceleration of the motor vehicle in accordance with a predefined algorithm in response to the driver overriding the adaptive cruise control system, the predefined algorithm ensuring a jerk-free transition from braking to acceleration of the motor vehicle.

2. The method according to claim 1, further comprising the step of calculating a setpoint acceleration to form the algorithm, the setpoint acceleration being dependent on a threshold value of the accelerator.

3. The method according to claim 2, further comprising the step of generating the threshold value for the accelerator as a function of the deceleration of the motor vehicle, according to a predefined curve.

4. The method according to claim 2, wherein, in order to exceed the threshold value, the driver needs to step on the accelerator more heavily during higher braking deceleration and less heavily during lower braking deceleration.

5. The method according to claim 1, further comprising the step of empirically ascertaining the algorithm.

6. The method according to claim 1, further comprising the step of storing values for the algorithm at least one of (a) in a table and (b) as a function.

7. The method according to claim 1, further comprising the step of controlling a braking pressure such that the braking intervention is terminated at a braking pressure of about 0, the braking pressure being controlled using an electronic stability program of a control unit.

8. The method according to claim 1, further comprising the step of transmitting setpoint values for engine and brake control via a vehicle bus.

9. The method according to claim 8, wherein the vehicle bus is a CAN bus.

10. The method according to claim 1, wherein the algorithm is carried out using a software program.

11. The method according to claim 10, wherein the software program is used in a control unit of the motor vehicle.

* * * * *